Feb. 27, 1951     H. PHILLIPS, SR     2,543,197
WHEEL ALIGNMENT GAUGE
Filed April 25, 1947     2 Sheets-Sheet 1
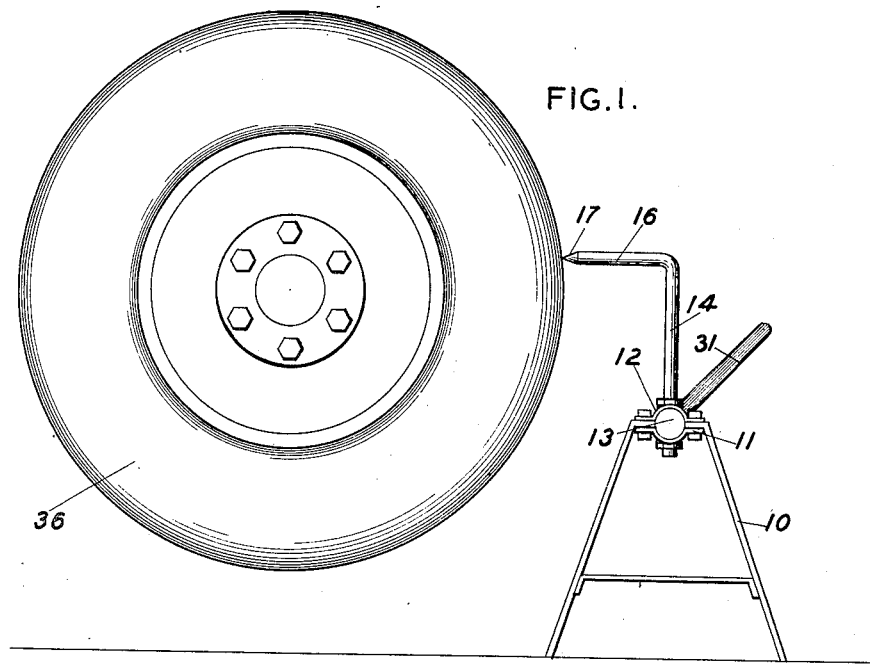
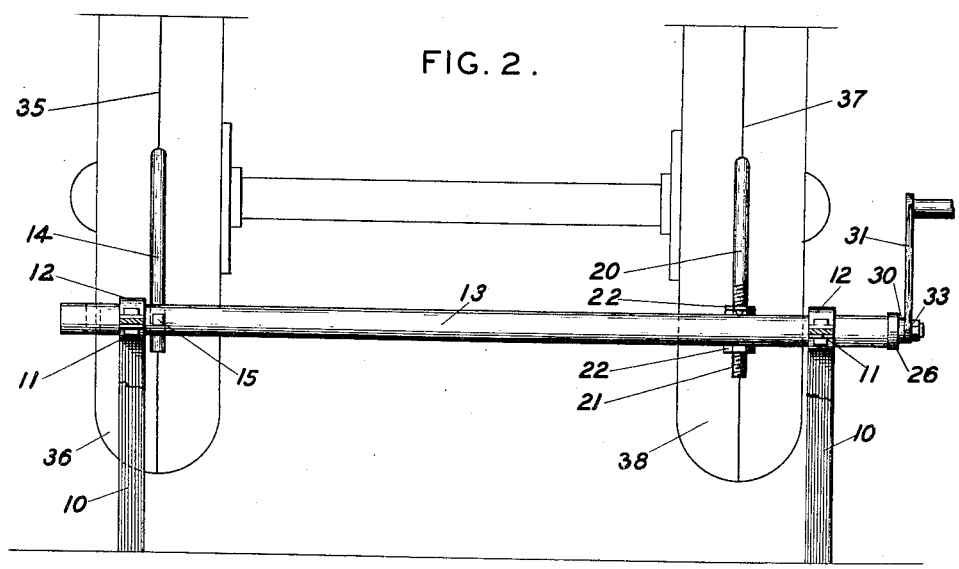
INVENTOR.
HERMAN PHILLIPS SR.
BY
McMorrow, Berman & Davidson
ATTORNEYS

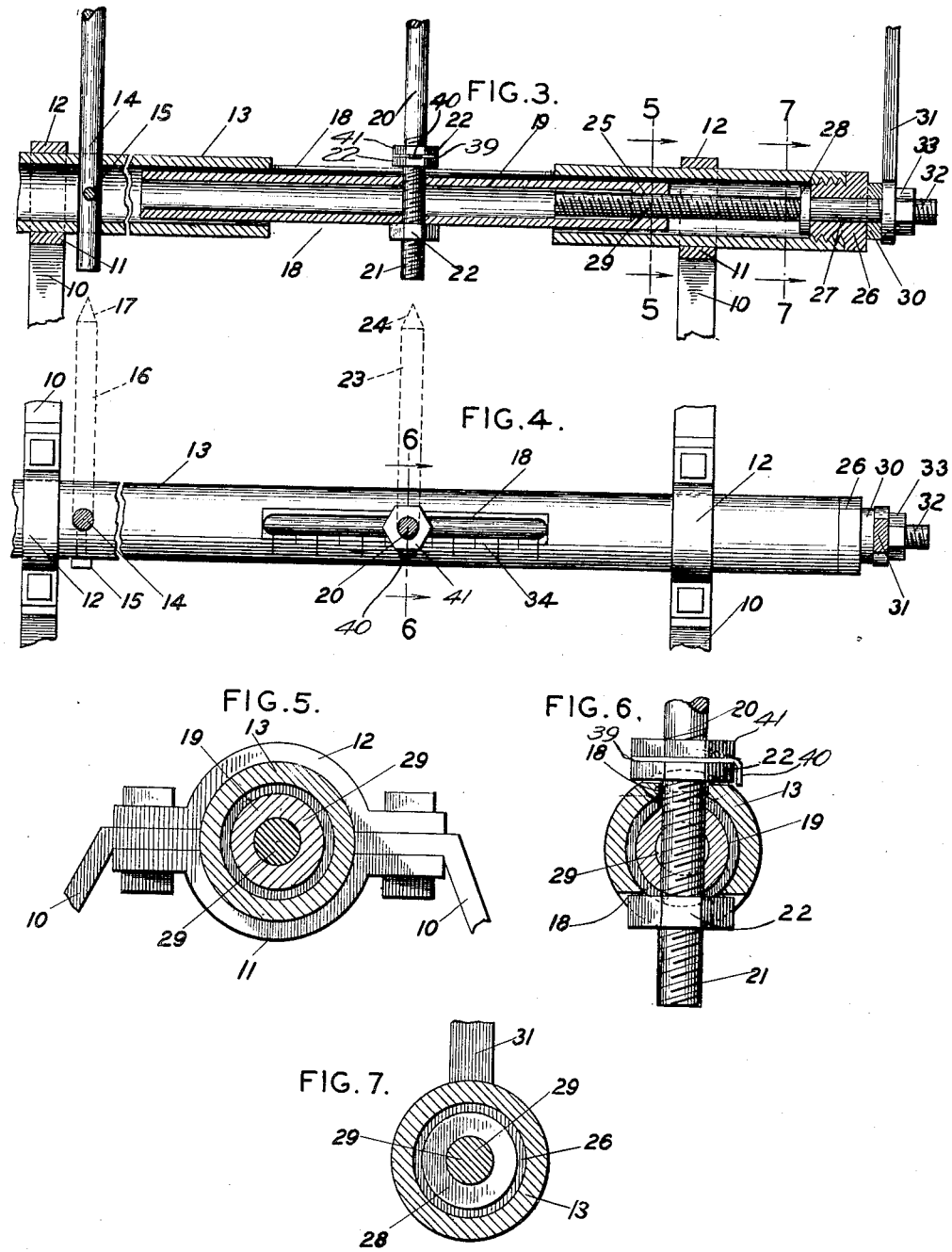

Patented Feb. 27, 1951

2,543,197

UNITED STATES PATENT OFFICE 2,543,197

WHEEL ALIGNMENT GAUGE

Herman Phillips, Sr., Evansville, Ind.

Application April 25, 1947, Serial No. 743,785

2 Claims. (Cl. 33—203.17)

My invention relates to gauges and more particularly to gauges for checking the alignment of automobile wheels.

The object of my invention is to provide a gauge adapted to be mounted in the rear of the two front wheels of an automobile, which rests on a jack, and to mark the two wheels all around their circumference by spinning them, and to check the alignment of the wheels, by mounting the gauge in front of the automobile after the car is taken off from the jack.

Other objects of my invention may appear in the following specification describing my invention with reference to the accompanying drawing illustrating a preferred embodiment of my invention.

It is however, to be understood that my invention is not to be limited or restricted to the exact construction and combination of parts described in the specification and shown in the drawing, but that such changes and modifications can be made, which fall within the scope of the claims appended hereto.

In the drawings:

Figure 1 is a side elevational view of the gauge according to my invention in contact with an automobile wheel, which is raised from the ground.

Figure 2 is a rear view of the front wheels of an automobile and of a gauge in contact with said wheels.

Figure 3 is a fragmentary vertical sectional view, in a larger scale, of a gauge according to my invention.

Figure 4 is a top plan view of Figure 3.

Figure 5 is a sectional view taken on line 5—5 in Figure 3.

Figure 6 is a sectional view taken on line 6—6 in Figure 4, and

Figure 7 is a sectional view taken on line 7—7 in Figure 3.

Referring now in detail to the drawings, the gauge forming the subject matter of my invention has two support frames 10 constructed from flat iron or any other suitable material in any desired and preferred manner. On top of each support frame a clamp member 11 is arranged having a cap 12.

A tube 13 is firmly but adjustably mounted in the two clamps 12 and extends beyond them at both ends. Adjacent to and inside of one of the supporting frames 10 an index rod 14 extends vertically through the tube 13 and is adjustably secured in position therein by means of a set screw 15 extending through a tapped hole in the wall of the tube 13 and arranged at right angles to the index rod 14. The upper portion 16 of the index rod 14 is bent at right angles to said rod and is pointed at its end, as shown at 17.

At a distance from and inside of the other supporting frame 10 a slot 18 is provided in the upper and lower portion of the circumferential wall of the tube 13, so that a rod extending through said slot would be arranged vertically.

A second tube 19 is slidably mounted inside the first mentioned tube 13 and a second index rod 20 extends through threaded holes in the circumferential wall of the second tube 19 and the slot 18 in the first mentioned ones. The lower portion of this index rod 20 is provided with a thread 21 engaging the threaded holes in the inner tube 19, and two clamp nuts 22 are arranged on this threaded rod portion, so that the nuts are adapted to clamp the outer tube 13 between them. Over the upper nut 22 an annular member 39 having a downwardly extending index finger 40 is arranged on the threaded portion 21 of the index rod 20 and is held in adjusted position by another clamp nut 41 on the threaded portion 21. This arrangement secures the index rod 20 and the index member 39—40 in position and permits slidable movement of tube 19 in the first tube 13. The upper portion 23 of the second rod 20 is bent at right angles. The end of this upper portion 23 is pointed as shown at 24. The length of the bent portion 23 of the second index rod 20 is equal to the length of the bent portion 16 of the first-named index rod 14. In use the points 17 and 24 will be positioned the same distance above the floor level.

The inside of the inner tube 19 is reamed out or enlarged with the exception of a short portion 25 at the end nearest to the secondly mentioned supporting frame 10. This short tube portion 25 is provided with an inner thread.

In the end of the outer tube 13 located outside of the second supporting frame 10 a thread is provided and a threaded plug 26 engages this thread and is located inside the outer tube 13. This plug has a centrally located, axially extending bore therein and an adjusting rod 27 is rotatably mounted in said bore and extends inwardly and outwardly of the plug 26. Adjacent the inner end of the plug 26 a washer 28 is rigidly mounted on the rod 27. The major portion 29 of the rod 27 is located inwardly from the washer 28 and is threaded. It engages the threaded end portion 25 of the inner tube 19 and extends into this tube.

Abutting the outside surface of the plug 26 a second washer 30 is rigidly mounted on the adjusting rod 27 so that the two washers prevent axial movement of said rod. A crank handle 31 is mounted on the adjusting rod 27, the outside end 32 of which is threaded. A nut 33 secures the crank handle 31 on the rod 27.

Along the lip of the slot 18 in the outer tube 13 a scale 34 is provided adapted to cooperate with the index finger 40 to indicate the setting of the index rod 20.

In order to check automobile wheels regarding their alignment and determine the amount of eventual deviation from the correct alignment, the car is jacked up and the gauge is put under the car back of the front wheels, so that the pointed upper end 17 of the first mentioned index rod 14 is positioned against the center line of the circumference of the left wheel. The second index rod 20 is adjusted by means of the nuts 22, so that the index point 24 of this rod is located at the same level as the first named index point 17. Then the second index rod 20 is adjusted transversely of the automobile by rotating the adjustment rod 27 by means of the crank handle 31, until the index point 24 of this second index rod 23 is located against the center line of the circumference of the right tire. The rotary movement of the adjusting rod 29 causes longitudinal or axial movement of the inner tube 19 through the thread engagement between the end 25 of the inner tube 19 and the major portion 29 of the adjusting rod 27. The second index rod 20 is secured in adjusted position by tightening of the lower nut 22 against the outer tube 18.

The front wheels 36 and 38 are spun around so that the tires on the wheels are marked all around their circumference by the index points 17 and 24, respectively, as indicated at 35 and 37.

The car is taken off the jack, after the gauge has been removed from its position under the car, and the gauge is placed in front of the car so that the first index point 17 is aligned with the mark line 37 on the right wheel tire 38. If the second index point 24 is then in alignment with the mark 35 on the left tire 36, the wheels are set with no toe-in. If a selected toe-in is desired, the linear toe-in of the front edge of the tire is first determined and the difference between the distance across the front and rear edges of the tire is noted on the scale 34 on the outer tube 13. The rod 20 is then adjusted by rotating the screw 29 until the index finger 40, carried by the rod 20 coincides with the scale marking noting this desired distance. The wheels must then be adjusted until the index fingers 17 and 24 coincide with the mark on the front edge of the tire. Upon changing the wheel alignment adjustment the tire mark must be again checked on the front and rear edges so that the desired toe-in may be determined from the difference between the distance across the front and rear of the tires.

Having described my invention I claim as new and desire to secure by Letters Patent:

1. A wheel alignment gauge comprising a pair of spaced apart supporting members, an elongated tubular member on said supporting members, an upstanding index rod on one end of said tubular member, means securing said index rod on said tubular member for adjustment radially thereof, said tubular member being formed with a pair of aligned axially extending slots adjacent the other end thereof, an inner tubular member in said other end of the first mentioned tubular member, screw threaded means engaging said inner member for sliding said inner member axially of said first tubular member, a second upstanding index rod extending through said slots, and screw threaded means adjustably securing said second index rod on said inner tubular member.

2. A wheel alignment gage of the kind described comprising a pair of spaced apart supporting members, an elongated tubular member on said supporting members, an index rod on one end of said tubular member, means adjustably securing said index rod on said tubular member radially thereof, said tubular member being formed with an axial slot adjacent to and spaced from the other end thereof, said slot being provided with a scale along one bounding wall thereof, means slidable axially in said tubular member, a second index rod rotatably supported in said slidable means and extending through said slot, a screw threaded crank in threaded engagement with said slidable means for adjusting said index rod axially of said tubular member, and an index carried by said index rod correlated with said scale, whereby the relative position of said index rods may be readily determined prior to and after adjustment of said second index member axially of said tubular member.

HERMAN PHILLIPS, Sr.

REFERENCES CITED

The following references are of record in the file of this patent:

UNITED STATES PATENTS

| Number | Name | Date |
|---|---|---|
| 693,554 | Reynolds | Apr. 29, 1902 |
| 1,001,433 | Olson | Aug. 22, 1911 |
| 1,663,452 | Hershman et al. | Mar. 20, 1928 |
| 2,003,188 | Heid | May 28, 1935 |
| 2,098,749 | Johnston | Nov. 9, 1937 |
| 2,368,908 | Witter et al. | Feb. 6, 1945 |

FOREIGN PATENTS

| Number | Country | Date |
|---|---|---|
| 394,090 | Great Britain | June 22, 1933 |
| 517,039 | Great Britain | Jan. 18, 1940 |